E. I. DODDS.
LOCK NUT.
APPLICATION FILED JAN. 22, 1913.
1,080,332.
Patented Dec. 2, 1913.
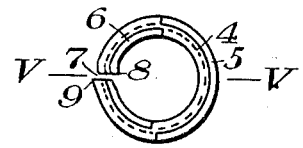
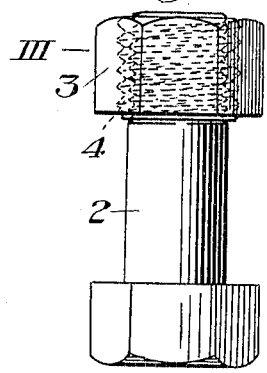
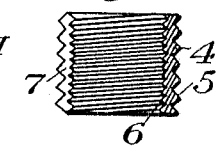
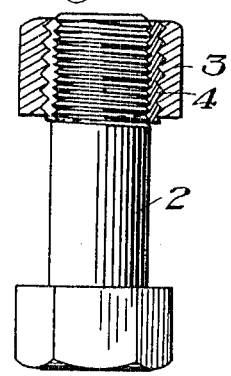
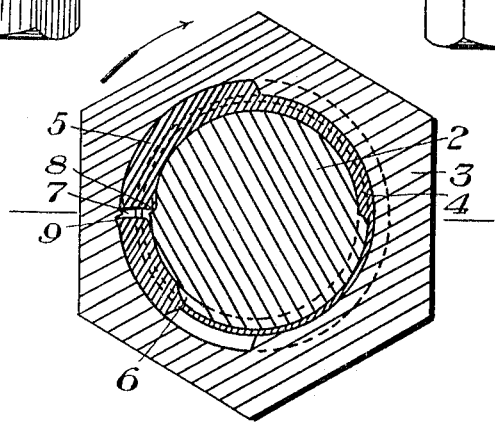
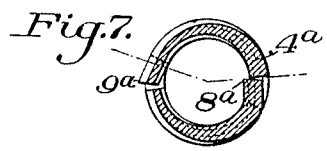
WITNESSES
INVENTOR

UNITED STATES PATENT OFFICE.

ETHAN I. DODDS, OF CENTRAL VALLEY, NEW YORK, ASSIGNOR TO KERNER MANUFACTURING COMPANY, OF PITTSBURGH, PENNSYLVANIA, A CORPORATION OF PENNSYLVANIA.

LOCK-NUT.

1,080,332.  Specification of Letters Patent.  Patented Dec. 2, 1913.

Application filed January 22, 1913. Serial No. 743,540.

*To all whom it may concern:*

Be it known that I, ETHAN I. DODDS, a citizen of the United States, residing at Central Valley, in the county of Orange and State of New York, have invented a new and useful Improvement in Lock-Nuts, of which the following is a full, clear, and exact description, reference being had to the accompanying drawings, forming part of this specification, in which—

Figure 1 is a plan view of a bolt and nut, the latter embodying my invention; Fig. 2 is a similar view with the nut in section; Fig. 3 is a section on the line III—III of Fig. 1 and on a larger scale; Fig. 4 is an end view of the locking sleeve or bushing; Fig. 5 is a section on the line V—V of Fig. 4; and Figs. 6 and 7 are sectional views showing a modified form of the sleeve or bushing.

My invention has relation to lock nuts and nut locks, and is designed to provide a simple and efficient nut-locking device which can be used with ordinary standard bolts and nuts and which can be assembled as a part of the nut to form a lock nut.

My invention also provides a very secure locking device which will not permit the bolt to jar or work loose in service.

Referring to the accompanying drawings, the numeral 2 designates a bolt of standard form, and 3 a nut which is also of standard form, but which has a bore of considerably greater diameter than the diameter of the threaded portion of the bolt.

The numeral 4 designates a sleeve or bushing which is of substantially the same length as the nut, and which is formed with an external thread 5, and with an internal thread 6. This sleeve or bushing is formed of metal having some spring or elasticity, and is longitudinally slitted or slotted at one side, and as shown at 7. One edge portion of the sleeve is inset inwardly to form the internal biting edge 8, and the other edge portion is offset or bent outwardly to form the external biting edge 9. The biting edges 8 and 9 are so related to the direction of the threads that the sleeve or bushing can be readily screwed on to the bolt or into a nut, the said edges riding over the threads in the manner of a pawl and ratchet. Upon reverse movement, however, the inner biting edge 8 bites into the threads of the nut. In this manner, the nut is securely locked against unscrewing from the bushing and the latter is securely locked against unscrewing from the bolt. The sleeve or bushing may be either screwed upon the bolt before the nut is applied, or it may be inserted into the nut and the nut and bushing then screwed upon the bolt.

While I prefer to construct the sleeve in the manner shown, it will be understood that the sleeve may be secured in the nut in other ways than those shown in the drawings.

In Figs. 6 and 7, I have shown a modification in which, instead of splitting the sleeve or bushing 4ª longitudinally, I slit it for any desired portion of its length at any desired number of points, and bend these slitted portions respectively outward and inward, as indicated, to form one or more exterior biting edges 9ª and one or more interior biting edges 8ª. These biting edges act in substantially the same manner as the biting edges 8 and 9, before described, the slitted and bent portions having inherent elasticity.

My invention provides a nut-locking device capable of use with nuts and bolts of standard form, without requiring any extra work to be done thereon. The sleeve or bushing can be manufactured at a relatively low cost, so as to add but little to the total cost of the bolt and nut. Inasmuch as the interior biting edge 8 has a biting engagement with the bolt thread throughout the full length or depth of the nut, a very secure locking action is obtained.

I claim:

1. A nut-locking device, comprising an internally threaded longitudinally slitted sleeve or bushing adapted to seat and be secured within the bore of a nut, and having one edge of its slitted portion bent or inset inwardly to form an internal biting edge, substantially as described.

2. A nut-locking device comprising a sleeve or bushing threaded both internally and externally and having a longitudinal slot at one side, one edge portion of the sleeve adjacent to the slot being inset inwardly to form an internal biting edge for the thread of the bolt, and the other edge being offset outwardly to form an exterior biting edge for the thread of the nut, substantially as described.

3. A nut lock device comprising a cylindrical sleeve or bushing having a slit, one of the edges of the slit being inset inwardly to form an interior biting edge, and its other edge being bent outwardly to form an exterior biting edge, said sleeve being threaded both interiorly and exteriorly, substantially as described.

In testimony whereof, I have hereunto set my hand.

ETHAN I. DODDS.

Witnesses:
  GEO. H. PARMELEE,
  H. M. CORWIN.

Copies of this patent may be obtained for five cents each, by addressing the "Commissioner of Patents, Washington, D. C."